(12) United States Patent
Leese

(10) Patent No.: US 9,278,666 B2
(45) Date of Patent: Mar. 8, 2016

(54) CHILD SAFETY SEAT

(71) Applicant: Britax Romer Kindersicherheit GmbH, Ulm (DE)

(72) Inventor: Gavin Paul Leese, Ulm (DE)

(73) Assignee: BRITAX RÖMER KINDERSICHERHEIT GMBH, Ulm (DE)

( * ) Notice: Subject to any disclaimer, the term of this patent is extended or adjusted under 35 U.S.C. 154(b) by 128 days.

(21) Appl. No.: 13/778,979

(22) Filed: Feb. 27, 2013

(65) Prior Publication Data

US 2013/0221728 A1   Aug. 29, 2013

(30) Foreign Application Priority Data

Feb. 29, 2012   (EP) .................................... 12001350

(51) Int. Cl.
*B60R 22/48* (2006.01)
*B60R 22/10* (2006.01)
*B60N 2/28* (2006.01)

(52) U.S. Cl.
CPC ............... *B60R 22/105* (2013.01); *B60N 2/28* (2013.01); *B60R 22/48* (2013.01); *B60N 2002/2815* (2013.01)

(58) Field of Classification Search
USPC ................... 297/484, 485, 486, 479
See application file for complete search history.

(56) References Cited

U.S. PATENT DOCUMENTS

| | | | | |
|---|---|---|---|---|
| 5,031,962 A * | 7/1991 | Lee | ............................... | 297/484 |
| 5,364,169 A * | 11/1994 | Collins et al. | ................. | 297/479 |
| 5,681,094 A | 10/1997 | Brown et al. | | |
| 5,704,684 A * | 1/1998 | Dukatz et al. | ................. | 297/238 |
| 7,011,341 B2 * | 3/2006 | Herberg et al. | ................ | 280/807 |
| 7,201,399 B2 * | 4/2007 | Frank et al. | ................ | 280/801.1 |
| 8,272,689 B2 * | 9/2012 | Biaud et al. | ................ | 297/250.1 |
| 2003/0071511 A1 | 4/2003 | Stafford et al. | | |
| 2007/0096891 A1 | 5/2007 | Sheriff et al. | | |
| 2007/0228787 A1 * | 10/2007 | Nakhla | ....................... | 297/250.1 |
| 2009/0160616 A1 | 6/2009 | Messner et al. | | |
| 2010/0109215 A1 * | 5/2010 | Ruthinowski et al. | ... | 267/140.13 |
| 2010/0253121 A1 | 10/2010 | Buckingham et al. | | |

FOREIGN PATENT DOCUMENTS

| | | |
|---|---|---|
| EP | 1 896 302 B1 | 7/2009 |
| GB | 2419154 A | 4/2006 |
| WO | WO-2010/088317 A1 | 8/2010 |

\* cited by examiner

*Primary Examiner* — Sarah McPartlin
(74) *Attorney, Agent, or Firm* — Nelson Mullins Riley & Scarborough LLP

(57) ABSTRACT

The object to provide a child safety seat for a vehicle with a harness that can be tightened and clamped at a predetermined tension is solved by the child safety seat for a vehicle according to the invention with a harness for restraining a passenger in said seat, whereas said harness is to be tightened and clamped at a predetermined tension when in use and at least one adjuster strap of said harness is guided through a spring loaded element enabled to maintain the predetermined tension in the at least one adjuster strap of said harness and whereas that adjuster strap runs then through a clamping device to avoid slip.

14 Claims, 3 Drawing Sheets

CHILD SAFETY SEAT

CROSS-REFERENCE

This application claims priority to and the benefit of European Patent Application No. 12001350.3-2424, filed Feb. 29, 2012, the contents of which are incorporated herein by reference in entirety.

FIELD OF THE INVENTION

The invention is directed to a child safety seat for vehicle with a harness for restraining a passenger in a seat, whereas the harness is to be tightened and clamped at a predetermined tension when in use.

BACKGROUND

It is known from the art to use child safety seats for a vehicle with a harness for restraining a passenger. The harness is to be tightened and clamped at a predetermined tension whereby the level of tension is determined by means of indicators, e.g. such as tension indicators as described in EP 1896302.

A child safety seat for a vehicle can only guarantee a maximum of safety if the person restrained in the seat is tightened by a harness under very specific conditions. Besides the location of the harness on the child's body the tension of the harness is of paramount importance. While it is obvious that a harness which is loose can not maintain its function to restrain a passenger, a harness that is tightened too much will be very uncomfortable for the passenger and hence not suitable for a longer journey.

SUMMARY

It is therefore the object of the invention to provide a child safety seat for a vehicle with a harness that can be tightened and clamped at a predetermined tension. This object is solved by the child safety seat of the invention according to embodiments described herein and in the claims. Additional advantageous embodiments are characterized in the claims.

A Child safety seat for a vehicle according to the invention with a harness for restraining a passenger in said seat, whereas said harness may be tightened and clamped at a predetermined tension when in use, is characterized in that at least one adjuster strap of said harness is guided through a spring loaded element enabled to maintain the predetermined tension in the at least one adjuster strap of said harness and whereas that adjuster strap runs then through a clamping device to avoid slip.

Advantageously the spring loaded element may be a spool comprising at least two pins around which the at least one adjuster strap may be routed when tightening the harness. The spring loaded element may also be realized by longitudinal springs or coils, cam, pin or lever mechanism.

Advantageously the pins may be eccentrically located within the spool.

Advantageously the spring loaded spool may be operatively connected to a ratchet and pawl.

Preferably the adjuster strap may run through a spool at one end and out of the other end of the spool, whereby the adjuster strap may be clamped upon the seat by clamping means.

Preferably the ratchet and pawl may be unlocked when opening the clamping means or pulling the adjuster strap to give the at least one adjuster strap free.

Preferably the ratchet and pawl may be unlocked by pulling on the adjuster strap by means of the ratchet and pawl assembly moving away from the pawl in the direction the adjuster strap is pulled.

Advantageously the spool/compensator may be located within the base of the seat.

Preferably optical and/or audible indicators or alerts may be provided to indicate the status of the spool and conversely the harness tension.

Preferably a status protocol of the spool may be sent via a radio frequency interface to a mobile device or a board computer interface within the vehicle.

BRIEF DESCRIPTION OF THE SEVERAL VIEWS OF THE DRAWINGS

The foregoing summary, as well as the following detailed description of the invention, may be more fully understood when read in conjunction with the appended drawings. For the purpose of illustrating the invention, examples are shown in the drawings. It should be understood, however, that the invention is not limited to the embodiments shown in the examples of the drawings, which are not necessarily drawn to scale, and wherein.

DETAILED DESCRIPTION

Figure 1:
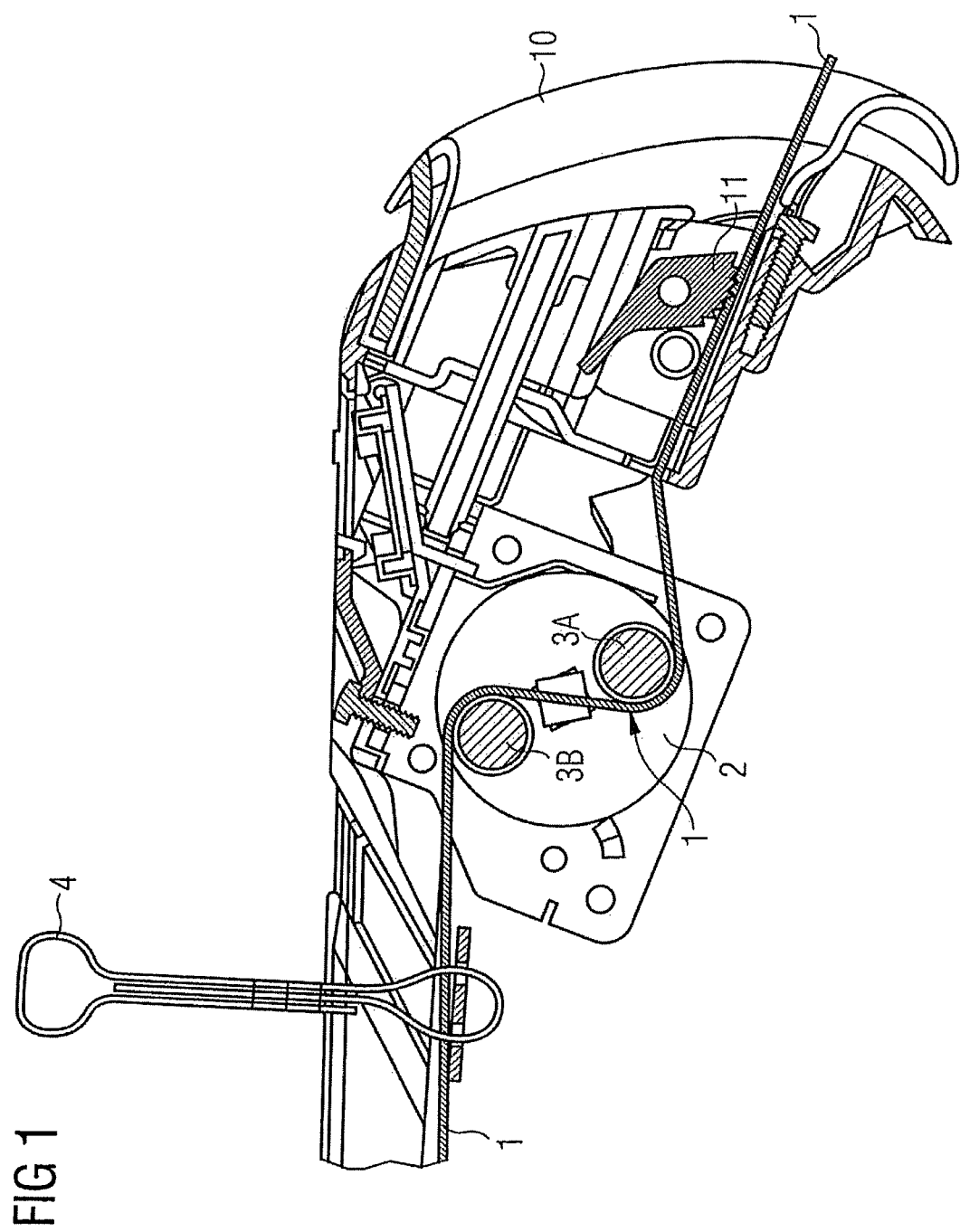
FIG. 1 shows a cross-sectional view of the compensator according to the invention within a base of a child safety seat.

The child safety seat according to the invention incorporating the pretension compensator enables the user to place the passenger in the seat and has the harness being fastened without any tension being applied to the harness.

This means that the passenger is able to put the harness buckle, e.g. a two tongue buckle, together and lock the harness. Once the harness is locked, the tightening process will be started by pulling the adjuster strap which is preferably located at the front end of the base of the child safety seat.

Since the adjuster strap may be routed through the compensator which has a pre-tensioning function, the risk that the harness is not tightened enough or is tightened too much can be completely eliminated.

The compensator according to the invention may be activated when the adjuster strap will be pulled. By pulling the adjuster strap, the spool will be rotated which will load the spring within the spool. The rotation of the spool causes the ratchet and pawl to be activated as well. By means of a stopper element, the ratchet will be stopped and further rotation of the spool is not possible. The energy stored in the loaded spool will make the spool rotate when the pretension level in the adjuster strap will be lowered. The tension in the adjuster strap will be lowered, if e.g. the child moves backwards and the harness becomes loose.

The concept of the compensator is based on the balance of the spring force which determines the pretension and the tension in the adjuster strap. If the tension of the strap is lower than the spring force, the spool will rotate as much as possible to bring the tension of the strap in balance to the spring force. Due to the stopper element, the tension in the adjuster strap may not exceed the spring force.

To indicate that the predetermined tension is reached, the child safety seat according to the invention comprises optical and/or audible indicators or alerts to indicate the status of the spool and conversely the harness tension. Such an indicator may be located at the front end of the seat and change from red to green when the predetermined tension is reached.

The status of the spool may also be transmitted to a device via Bluetooth® technology which may be located in the front of the car, such as a handheld device or a bord computer or a dashboard information units to inform the driver of the vehicle about the status of the spool.

A typical scenario is that a child will be placed in the child safety seat and the harness will be fastened and tightened to reach the predetermined tension level. During the journey, the child will relax and find a comfortable position in the seat. Since the harness was fastened with a specific level of tension, the harness would become loose and the purpose of the harness will be partly diminished. With the inventive compensator, the harness would be re-tightened by the loaded spring in the base of the seat. If for instance the harness will be loosened by movement of the adjuster strap by 1 cm, the compensator will rotate as much as necessary to adjust for 1 cm of the strap.

The automatic adjustment will take place as often as necessary but the amount is limited to the number of teeth on the ratchet.

In order to be able to make fine adjustments, the number of teeth on the ratchet may be high and the distance of the teeth to each other may be small. It is also possible to change the distance of the teeth along the ratchet since it may be advantageous to have a normal or course adjustment at the beginning of the tensioning process and a fine adjustment at the end of the tensioning process.

In order to loosen the harness, the commonly known technique to push the release button will also deactivate the spool and give the adjuster strap free.

One preferred embodiment of the invention will be explained in more detailed by means of the figures.

FIG. 1 shows how the adjuster strap 1 runs through a child safety seat 10. The left end of the adjuster strap 1 runs into the harness or is part of the harness (not shown). The harness (not shown) will be fastened through the fixation means 4 which might have a buckle (not shown). The tension between the harness being fixed at one end at the fixing means 4 and at the other end at the adjuster strap should be of a predetermined value to deploy the best performance of the harness. The right end of the adjuster strap 1 will leave the seat and may have a loop to which the user may hold on when pulling the adjuster strap 1.

When pulling the adjuster strap 1, the guiding pins 3A and 3B will be forced to move and by that initiate a rotation of the spool 2. The clamping device 11 is also spring loaded and allows only to pull the adjuster strap 1 in one direction, i.e. out of the base. Due to that, the adjuster strap 1 will be prohibited from releasing any tension since the clamping device 11 will open upon pulling the adjuster strap 1 towards outside the seat but close upon pulling the adjuster strap 1 towards inside the seat.

Figure 2:
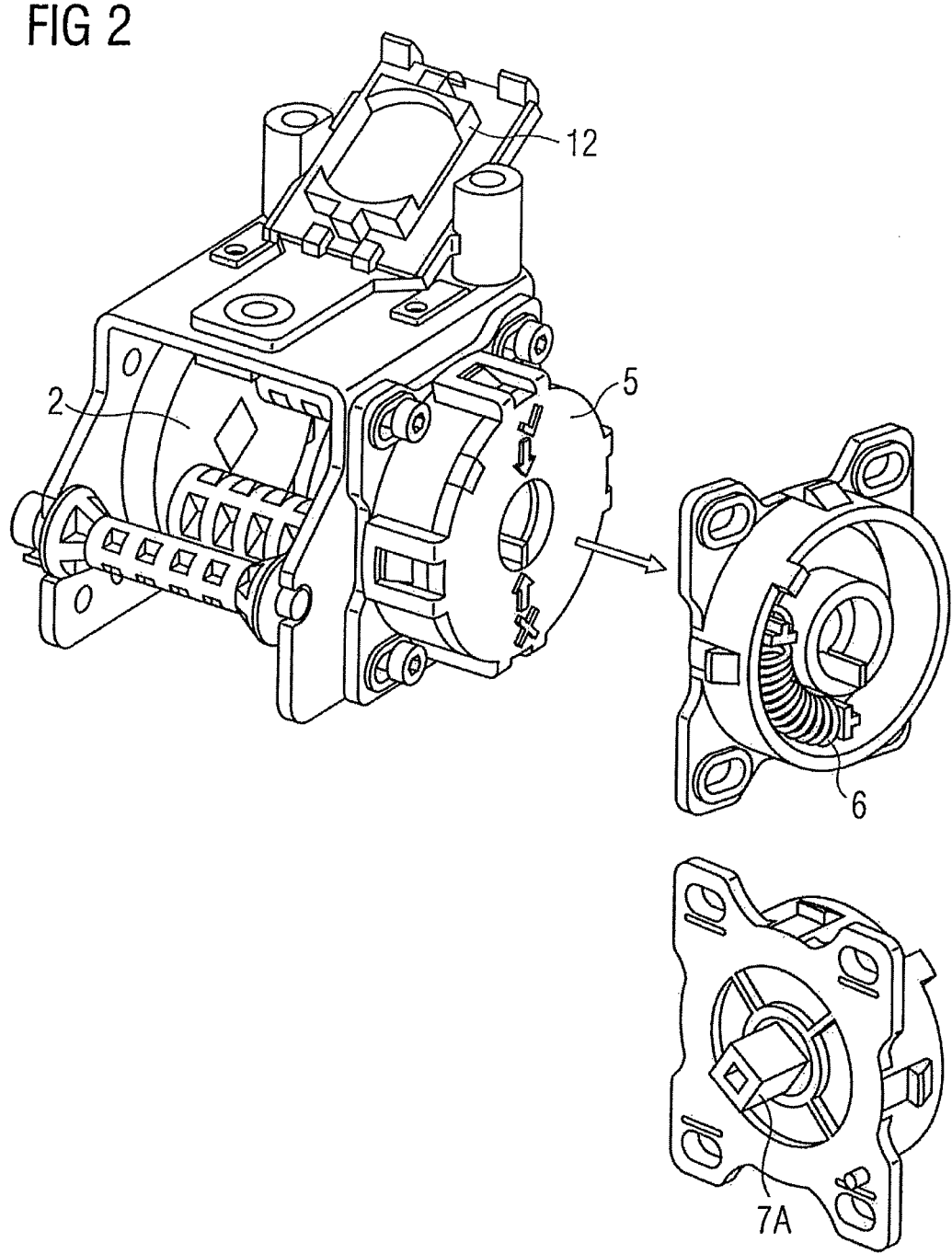
FIG. 2 shows a perspective view of the compensator according to the inventions with detailed views.

FIG. 2 shows the location of the spring house 5 and the spring 6. The spring housing 5 comprises a rotating axel 7A which will be powered by the spring 6 inside the spring housing 5. The compensator may further comprise a LED and battery holder for an information interface 12, whereby the interface is not shown.

Figure 3:
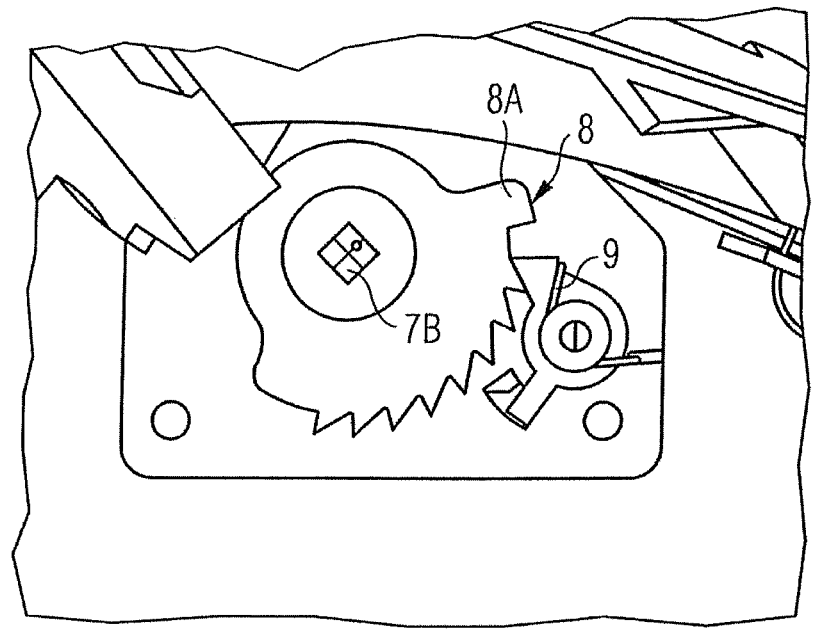
FIG. 3 shows a frontal view of one side of the compensator according to the invention.

FIG. 3 shows the other side of the compensator with the rotating axel 7B which is powered by the spring 6 (not shown) and forces the ratchet 8 to rotate along pawl 9. The teeth of the ratchet 8 are shown in equal distance to each other. The distance of the teeth may, however, vary to make fine adjustments. The ratchet 8 further comprises a stopper element 8A to bring the rotation of the spool 2 (not shown) to halt.

The invention claimed is:

1. A child safety seat for insertion into a vehicle for restraining a passenger in the child safety seat continuously during a journey, the child safety seat comprising;
   a base; and
   a harness operably coupled to the base,
   wherein said harness is to be tightened and clamped at a predetermined tension when in use, characterized in that at least one adjuster strap of said harness is guided through a spring loaded element enabled to repeatedly retract the at least one adjuster strap of said harness to maintain the predetermined tension in the at least one adjuster strap of said harness continuously during the journey, wherein the spring loaded element is a spool and the adjuster strap runs through the spool at one end and out the other end of the spool, and wherein the adjuster strap runs then through a clamping device and is clamped upon the child safety seat by the clamping device to avoid slip.

2. The child safety seat according to claim 1, wherein the spring loaded element is a spool, cam, pin or lever mechanism.

3. The child safety seat according to claim 1, wherein the spring loaded element is a spool comprising at least two pins around which the at least one adjuster strap is routed when tightening the harness.

4. The child safety seat according to claim 3, wherein the pins are eccentrically located within the spool.

5. The child safety seat according to claim 3, wherein the spring loaded spool is operatively connected to a ratchet and an associated pawl.

6. The child safety seat according to claim 1, wherein the spring loaded element is operatively connected to a ratchet and an associated pawl.

7. The child safety seat according to claim 6, wherein the ratchet and pawl are unlocked when opening the clamping means or pulling the adjuster strap to give the at least one strap free.

8. The child safety seat according to claim 6, wherein the spring loaded element is located within the base of said seat.

9. The child safety seat according to claim 1, wherein optical and/or audible indicators or alerts are provided to indicate the status of the spring loaded element and conversely the harness tension.

10. The child safety seat according to claim 9, wherein a status protocol of the spring loaded element is sent via a radio frequency interface to a mobile device or a board computer interface in the vehicle.

11. The child safety seat according to claim 1, wherein a status protocol of the spring loaded element is sent via a radio frequency interface to a mobile device or a board computer interface in the vehicle.

12. The child safety seat according to claim 1, wherein an electromechanical component rotates and/or preloads the spring loaded element.

13. The child safety seat according to claim 12, wherein the electromechanical component is a power-spring or an electric motor or a servomotor.

14. The child safety seat according to claim 1, wherein a load limiter is realized in the pretension of the spring loaded element which is able to control the release of the adjuster strap in a dynamic load.

* * * * *